United States Patent [19]
Millhimes et al.

[11] Patent Number: 4,740,167
[45] Date of Patent: Apr. 26, 1988

[54] POWER DISTRIBUTION UNIT FOR MODULAR WALL PANELS

[75] Inventors: Wayne L. Millhimes, Hershey; Daniel J. Murren, Dillsburg; Wilmer L. Sheesley, Dauphin, all of Pa.

[73] Assignee: AMP Incorporated, Harrisburg, Pa.

[21] Appl. No.: 790,772

[22] Filed: Oct. 24, 1985

Related U.S. Application Data

[63] Continuation of Ser. No. 585,710, Mar. 2, 1984, abandoned.

[51] Int. Cl.$^4$ .......................................... H01R 13/652
[52] U.S. Cl. ...................................... 439/92; 439/170; 439/222; 439/640; 439/654
[58] Field of Search ................. 339/21 R, 22 R, 22 B, 339/198 J, 14 R, 14 RP, 23, 24, 20, 31 R, 31 M, 36, 154 A; 174/48; 439/92, 166, 170–175, 217–224, 638, 640, 650–654

[56] References Cited

U.S. PATENT DOCUMENTS

| | | | |
|---|---|---|---|
| 3,213,403 | 10/1965 | Herrmann et al. | 339/22 B |
| 3,263,131 | 7/1966 | Rowe | 339/154 A |
| 3,890,030 | 6/1975 | McDaniel | 339/113 L |
| 4,040,710 | 8/1977 | Damsky | 339/154 A |
| 4,085,988 | 4/1978 | Gamble | 339/22 B |
| 4,090,769 | 5/1978 | Damsky | 339/156 R |
| 4,231,630 | 11/1980 | Propst et al. | 339/22 R |
| 4,278,334 | 7/1981 | Boundy | 339/22 R |
| 4,278,834 | 7/1981 | Boundy | 339/22 R |
| 4,295,697 | 10/1981 | Grime | 339/22 R |
| 4,313,646 | 2/1982 | Millhimes et al. | 339/156 R |
| 4,376,561 | 3/1983 | Hoek et al. | 339/21 R |
| 4,462,656 | 7/1984 | Beyer | 339/22 B |
| 4,494,808 | 1/1985 | Wide et al. | 339/22 B |

Primary Examiner—John McQuade
Attorney, Agent, or Firm—Allan B. Osborne

[57] ABSTRACT

The present invention is a power distribution unit for electrification of modular wall panels such as used in office buildings and the like. More particularly the invention includes a central junction box, that houses six buss bars three power, one neutral and two ground bars, and two duplex receptacles, pluggable into the sides of the box.

3 Claims, 5 Drawing Sheets

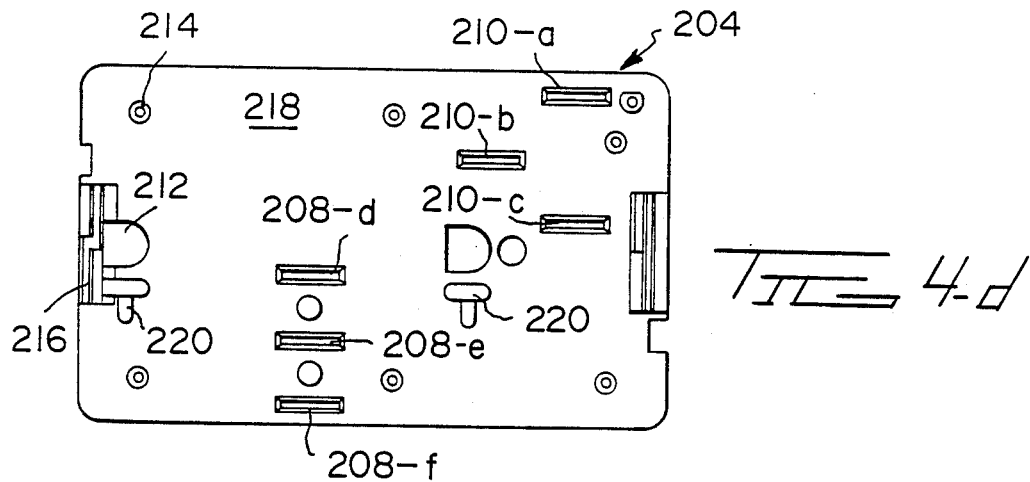
FIG. 4-d
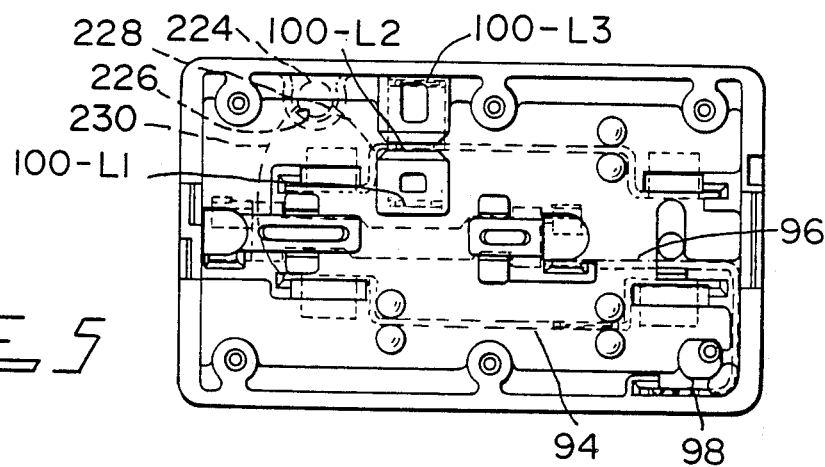
FIG. 5

POWER DISTRIBUTION UNIT FOR MODULAR WALL PANELS

This application is a continuation of application Ser. No. 585,710, filed Mar. 2, 1984, and now abandoned.

BACKGROUND OF THE INVENTION

1. Field of the Invention

The invention disclosed herein is in the field of electrical wiring systems for movable room dividers and modular wall panels used in office buildings, restaurants, retail stores and the like.

2. Prior Art

The present invention is a novel improvement and a departure from at least the following:

| Patent No. | Patentee | Class/Subclass |
| --- | --- | --- |
| 4,295,697 | Grime | 339/22 R |
| 4,313,646 | Millhimes et al | 339/156 R |

Grimes disclosed an electrical power distribution block secured to the lower portion of a metal frame of each space-dividing panel. The distribution blocks in an assembly of panels are electrically connected together. Whenever access to electrical power on either side of a panel is desired, a slide-in duplex receptacle is mounted on the distribution block on that side. The receptacles interlock with the blocks to provide built-in stress relief, without separate mechanical fasteners, against forces generated by plugging into or removing a plug from the receptacle. The terminals of the blocks are recessed and the receptacle terminals which connect with the block terminals are shielded in plastic sleeve portions of the receptacles. The conductors of both the blocks and the receptacles are molded in place.

Millhimes et al teaches a combination power distribution block-duplex receptacle for being positioned in a panel raceway. Contained within the structure are five buss bars providing multiple top-off capabilities.

SUMMARY OF THE INVENTION

The invention disclosed herein provides a power distribution unit for use with an electrical wiring system employed in movable room dividers and modular wall panels. The unit includes a central junction box and a pair of duplex receptacles which plug into the sides of the box. The box contains, in a predetermined pattern, spaced apart buss bars having spade or tab terminals at each end and female sockets intermediate the ends for receipt of flat tabs associated with contacts in the pluggable duplex receptacles. Further included is a dedicated ground buss bar and contact.

BRIEF DESCRIPTION OF THE DRAWINGS

FIG. 2A is an isometric view of the sockets on one buss-bar;

FIG. 4-d is a view of one side of the cover of the duplex receptacle; and

FIG. 5 is a view looking into the duplex receptacle housing with the positioning of the contacts therein indicated by dashed lines.

DESCRIPTION OF THE INVENTION

Figure 1:
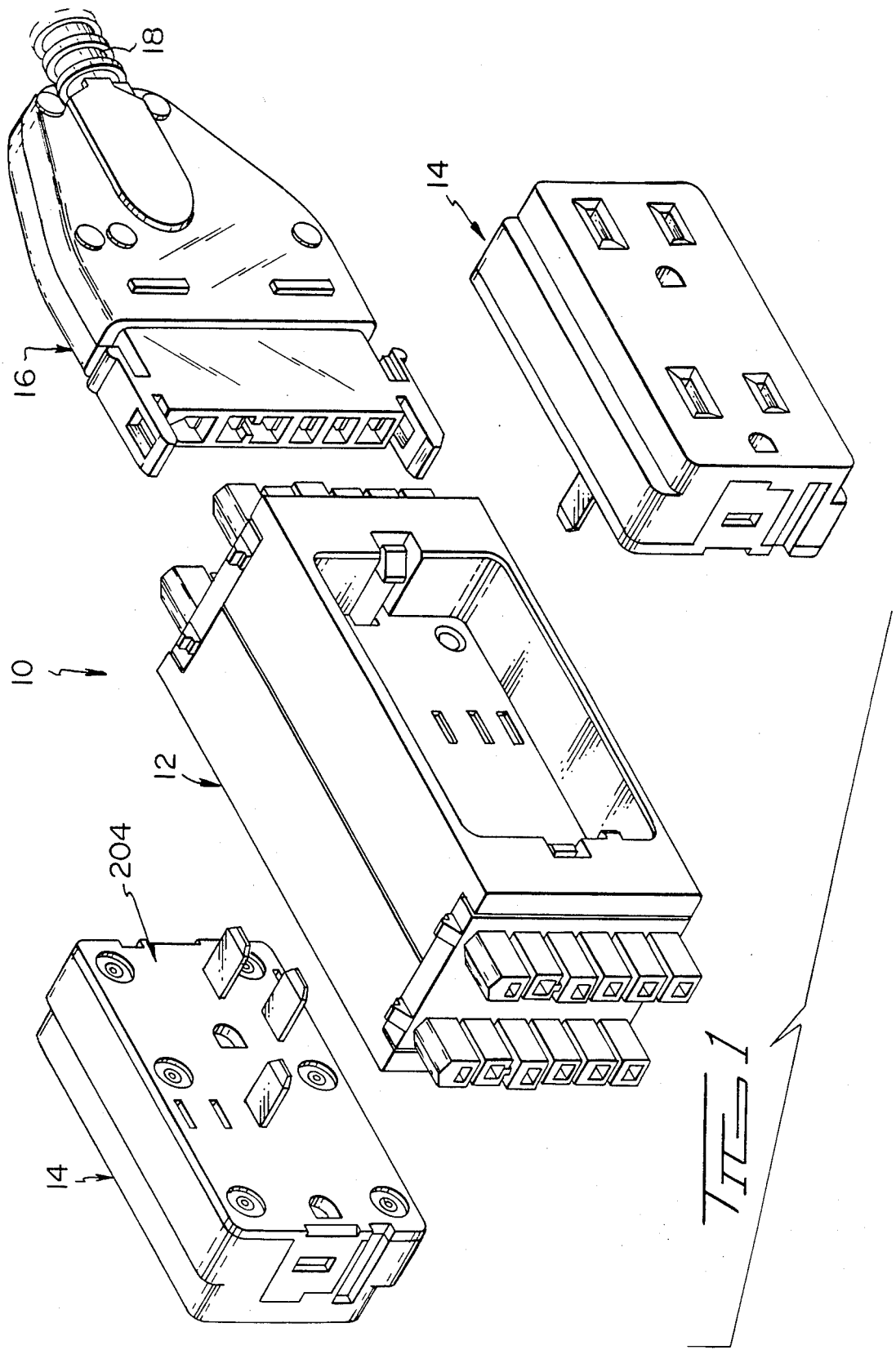
FIG. 1 is an isometric view of the power distribution unit constructed in accordance with the preferred embodiment of the present invention.

With reference to FIG. 1 power distribution unit 10 includes junction box 12 and a pair of duplex receptacles 14. Further included but not shown is a face plate to be used in lieu of a receptacle. Also shown in FIG. 1 is connector 16 which connects armor-covered wires 18 to block 12. Connector 16 and wire 18 are not components of the present invention.

Power distribution units 10 are positioned in the wiring raceways of modular wall panels (not shown) wherever power is required. Maximum utilization of the units are obtainable when they are positioned where electrical devices; e.g., typewriters, lamps, computers, cash registers, are located on both sides of the wall panel adjacent the unit. Wires 18 in the raceway carry current from the source (not shown) to each unit, connectors 16 providing the connection to the boxes. Duplex receptacles 14 plug into box 12 and project out thru openings in the panels to accept conventional three prong electrical plugs (not shown).

Figure 2:
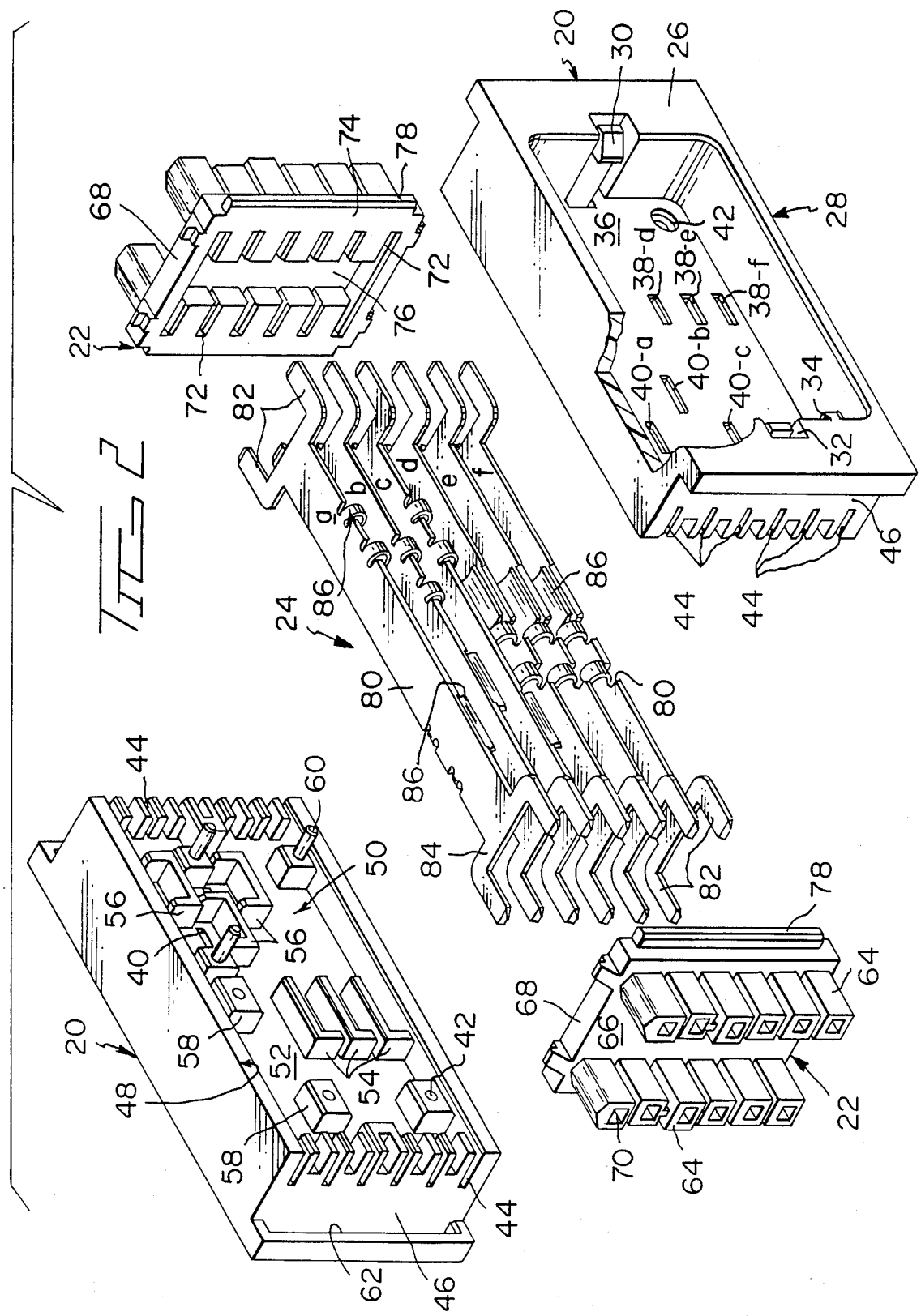
FIG. 2 is an isometric view of an exploded power distribution unit of FIG. 1.

FIG. 2 is a view of the junction box 12 FIG. 1 disassembled. The several parts thereof include two side members 20, two end members 22 and six buss bars, collectively identified by reference numeral 24. The side and end members are preferably molded from a suitable insulating plastic such as a polycarbonate having a suitable dielectric rating. The buss bars are preferably stamped and formed from a conductive material such as a copper alloy and plated with tin.

With respect to the side members which are identical to each other in all respects, the outer surface 26 includes receptacle-receiving recess 28. Latch arms 30 are provided in grooves 32 located in the opposing recess walls defining the ends of the recess. A rail 34, projecting into the recess, is provided on one end wall.

Two sets of three apertures each open out onto floor 36 of recess 28. Apertures 38 of the first set are arranged in a row adjacent one side wall of the recess; in the drawing it is the lower side wall; these apertures are further identified by letters d, e and f. Further the row is displaced to one side of the center of the recess. Apertures 40 of the second set are arranged in a staggered pattern and are in a corner adjacent the upper side wall which is broken away so that they may be seen more clearly. These apertures are further identified by letters a, b and c. The first set of apertures 38 receive power tabs on the duplex receptacles and the second set receive neutral and ground tabs.

In addition to the apertures, several holes 42 (only one shown) open out onto recess floor 36.

There are six slots 44 in each end wall 46 of each side member.

Inside surface 48 includes a shallow recess 50, defined in part by the slotted end walls 46. The aforementioned apertures 38 and 40 open out onto floor 52 of this recess. The apertures 38 of the first set (not visible) are isolated primarily by the three L-shaped walls 54. The apertures 40 (one being visible) are isolated primarily by three U-shaped walls 56.

A number of blocks 58 on recess floor 52 have either a hole 42 therethru (opening out in a recess 28 of the outside surface) or peg 60.

Grooves 62 are provided on inside surface 48 adjacent each end wall 46.

The two end members 22 are also identical one to the other. Two rows of protective shrouds 64 project out from the outer surface 66 of wall 68. One or more shrouds may include polarizing means. Each shroud defines an opening 70 which extends thru wall 68 and merges into slot 72 seen on inside surface 74 of that wall. Centrally positioned recess 76 in the inside surface intersects the slots. Rails 78 are provided on both lateral sides of wall 68.

The six buss bars 24 are separately identified by letters "a" thru "f", these letters being found on straps 80 adjacent the far ends.

The ends of each bar is bifurcated to provide a pair of spaced apart, tabs 82 and supporting arm 84 which is normal to the strap and tabs. The tabs are parallel to each other and to the strap.

Each strap is provided two tab-receiving sockets 86 which open in opposing directions. A strap portion with two sockets is shown in FIG. 2A. It includes a spring 88 overlying and attached to the strap by hinges 90. The free end 92 of the spring is turned up in the manner of a ski. The strap immediately below the free end is beveled as indicated by reference numeral 94.

With reference to FIG. 2 again, buss bars a and c are identical and interchangeable with each other. The sockets on those two bars are located near the ends of the strap. Bar b differs from a and c in that the sockets are spaced closer in towards the center. Bar b is thus unique and not interchangeable.

Buss bars d, e and f are identical and interchangeable, one with the other. The two sockets thereon are immediately adjacent to each other and are located in the center segment of the strap.

A tab enters the socket between the strap surface and overlying spring. The space between the surface and spring is less than the thickness of the tab so that the spring is resiliently deformed, placing the tab in compression.

A junction box is assembled by first fitting end members 22 onto the bifurcated ends of buss bars 24. The tabs enter slots 72 and into openings 70 in the shrouds. The supporting arms 84 enter into the slots and center recess 76. The buss bar b must be the second bar from the top. Bars a and c must be located in the first and third levels but not necessarily respectively. Bars d, e and f occupy the fourth, fifth and sixth levels, also not necessarily respectively. The bars can be rotated; i.e., turned end for end, without orientation problem.

The six buss bars are firmly held in the proper position by the two end members. The side members are slid in between the end members and onto the straps with the open ends of sockets 86 entering into the sheltered or isolated areas defined by L-shaped and U-shaped walls 54 and 56 respectively. In this respect, the side members can be pushed into either side but they must be properly orientated so that the sockets on bars a, b and c are in alignment with the second set of apertures 40 and are within the U-shaped wall areas. Similarly, the sockets on bars d, e and f are in the L-shaped wall areas and are in alignment with apertures 38.

The side members in the drawings of FIG. 2 are properly oriented with respect to the sockets on the buss bars. Reiterating a bit, the side members would still be properly orientated for assembly if they were interchanged by being slid around the end members but not if they were interchanged by being rotated over and under the buss bars. If this happened however, proper orientation would be reached by simply turning each side member clockwise 180 degrees.

As the side members are being drawn together with the buss bars in between, pegs 60 on one side member enter holes 42 on the other and, being of sufficient length, the free ends extend into recesses 28. The ends are cold staked so that the two side members are secured together.

The end members are locked into the side members by rails 78 on the former entering grooves 62 on the latter.

Figure 3:
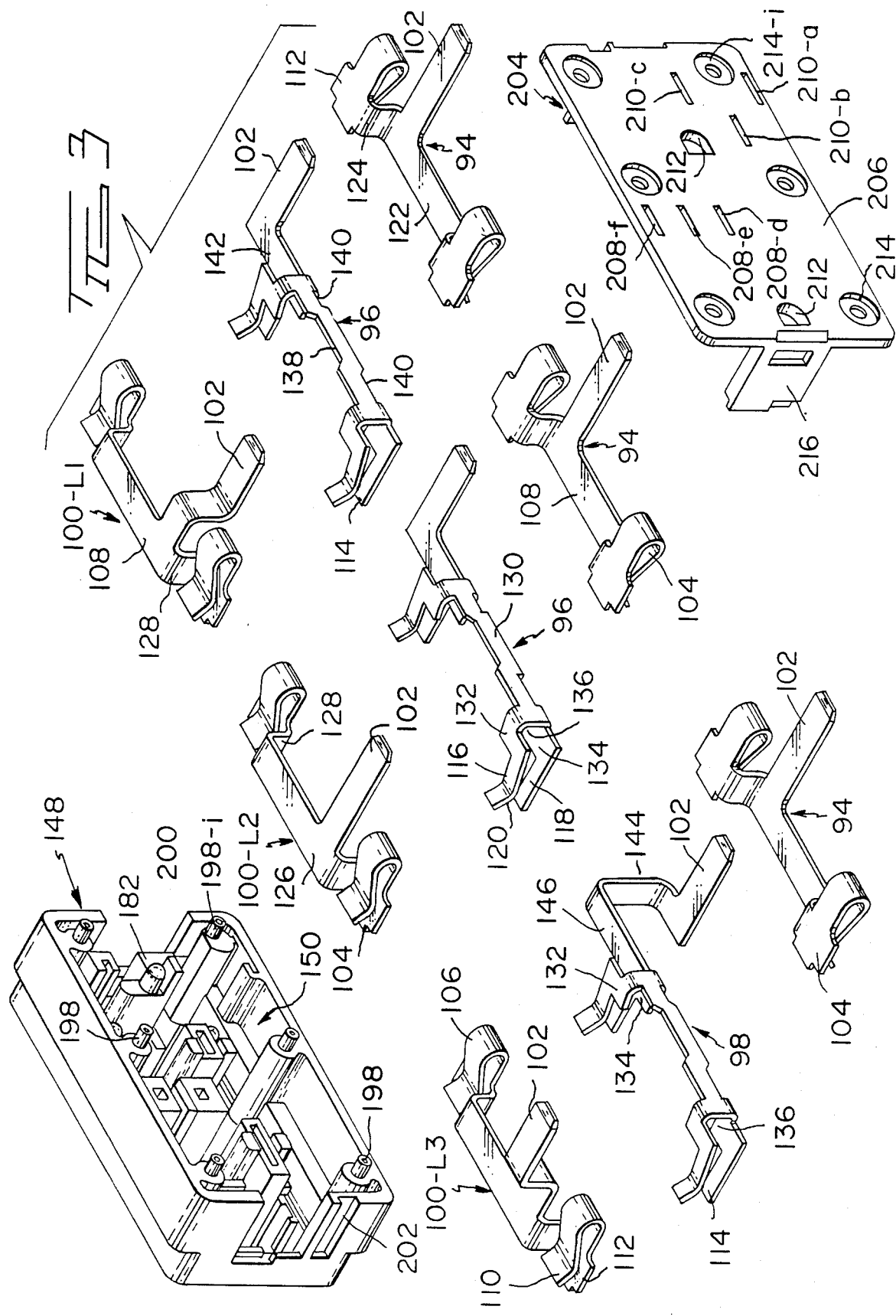
FIG. 3 is an isometric view of an exploded duplex receptacle of FIG. 1 showing combinations of different contacts for use therein.

FIG. 3 is an isometric view of a duplex receptacle with the cover removed and with the several contacts used there with.

With regard to the contacts, there are neutral contacts 94 (three shown), common ground contacts 96 (two shown), an isolated or dedicated ground contact 98 and power or live contacts 100-L1, 100-L2 and 100-L3. All contacts have in common, a male tab terminal, hereinafter referred to as tab 102. These tabs extend normally relative to the rest of the contact and the duplex receptacle as shown in FIG. 1.

The neutral and power contacts (94, 100) have tab-receiving sockets 104 which consists of a spring 106 attached to and bent back around to overlie the elongated strip or bar 108. The spring curves down towards the bar with the free end 110 turned up. This provides a convex surface facing the bar. Except for ear 112, a continuation of bar 108 but reduced in width, the sockets are located at the ends of the contact. Additionally, the opening or mouth of the sockets are substantially at one edge of bar 108.

The ground contacts 96, 98 are designed to receive the ground pin or prong on a conventional 3-prong plug. The sockets 114 thereon consist of a spring 116 overlying a finger 118. The free end of the spring is curved up as indicated by reference numeral 120.

The design or shape of the bar on the contacts determine the positioning of tabs 102 with respect to sockets 86 on buss bars 24 located in junction box 12. Beginning with the simplest design, the bar 108 or contact 94 is formed into a U-shape by vertically displacing the center portion 122 downwardly. The displacement wall, indicated by reference numeral 124, is adjacent each socket. The tab 102 is located on the displaced center portion adjacent one displacement wall; i.e., on the right handed side.

Bar 108 on power contacts 100-L1, L2, L3 is U-shaped with center portion 126 being displaced upwardly relative to the sockets thereon. The displacement wall is indicated by reference numeral 128 and is adjacent the sockets. Tabs 102 are located adjacent the left handed displacement wall. The tab on contact 100-L2 projects straight away from bar 108. The tab on contact 100-L1 is displaced downwardly and the tab on contact 100-L3 is displaced upwardly. Incidently, contact 100-L2 is identical to contact 94.

Ground contacts 96 and 98 are formed with bar 130 thereon being at the closed end of the sockets 114 and with the width being perpendicular to the plane of the tabs. The spring 116 and finger 118 are attached to one end of turned in sections 132 on one side and 134 on the other side of the bar. These sections define space 136 there between. Tabs 102 are an extension of sections 134.

Center notch 138 is provided on one side of bar 130 and end notches 140 are provided on the opposite side.

Ground contacts 96 and 98 differ only with respect to the location of tabs 102. The tab on the former contact includes extension 142 of section 134 and the tab 102 which is at right angles thereto and on the same plane.

Tab 102 on dedicated ground contact 98 is displaced downwardly by means of vertical L-shaped arm 144 attached to an extension 146 which is longer than extension 142 on contact 96.

The aforementioned contacts are positioned in housing 148, the front of which is shown in FIG. 1. As is readily apparent the front or face is that of a conventional duplex receptacle found in most homes.

The back of the housing includes a recess 150 in which are structures to receive and retain 94, 96, 98 and the 100 series contacts. To describe these structures in an adequate manner, reference will be to FIGS. 4-a, 4-b and 4-c for the most part. The isometric view in FIG. 3 is instructive though in that the depth element is present. That view also tells the reader that the structures are attached to the recess floor 152 and extend upwardly therefrom.

Figure 4:
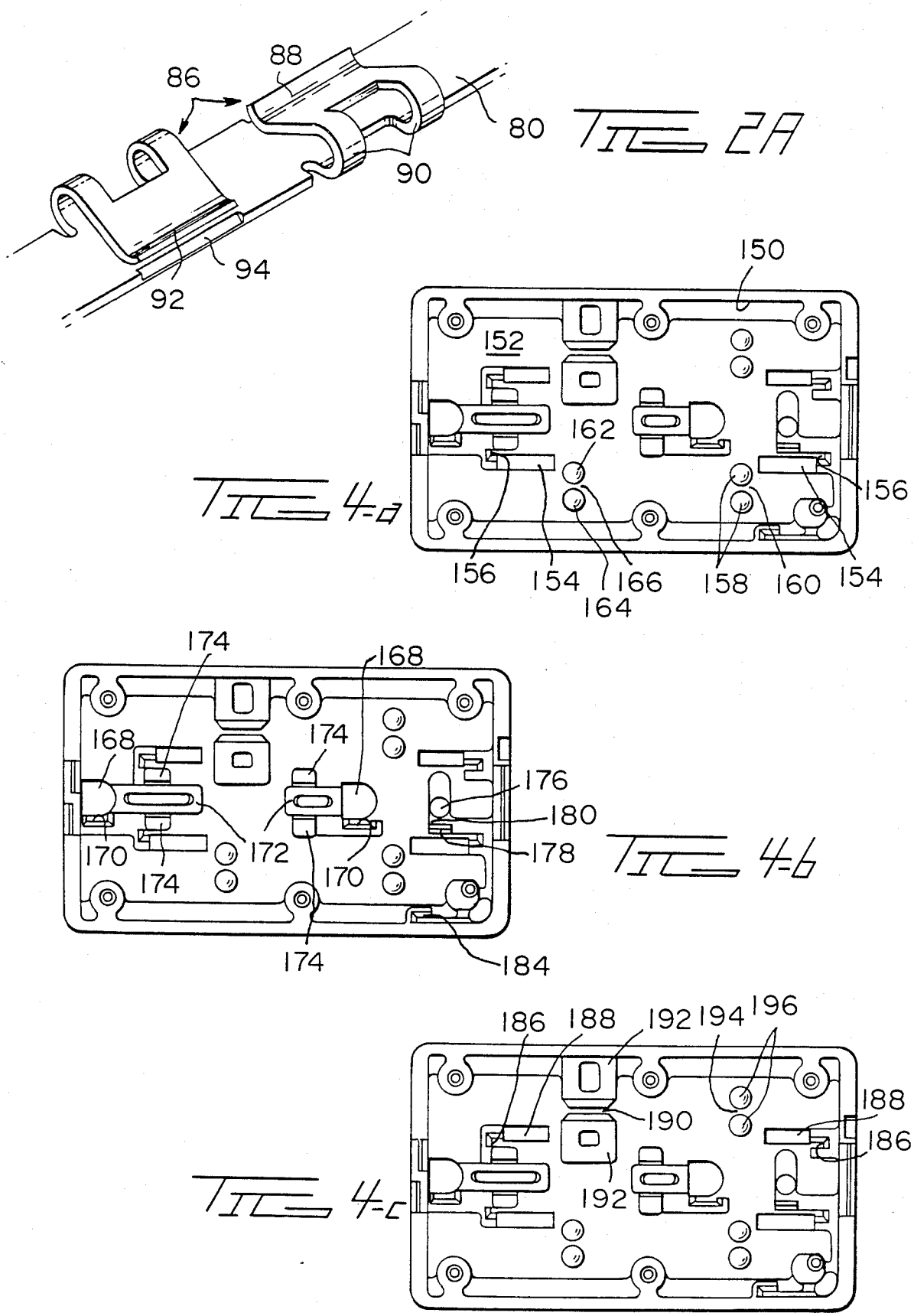
FIGS. 4-a, 4-b and 4-c are views looking into the housing of the duplex receptacle.

With specific reference to FIG. 4-a, the following structures relate to contact 94. Apertures 154, through which the neutral prong on a conventional plug passes, are located within slots 156. Posts 158 define gap 160 there between. Posts 162 and 164 define gap 166 there between. Contact 94 is placed into recess 150 with the open end of sockets 104 adjacent apertures 154. The displacement walls 124 are between the aperture and post 162 at one end and the aperture and the closest post 158 thereto at the other end. The center portion 122 extends between the apertures, and is positioned in gaps 160 and 166. The ears 112 are received in slots 156. FIG. 5 is a FIG. 4-a view showing the contacts in stick form to illustrate the positioning in recess 150. Not shown in that the edge of the contact is just slightly above the floor of the recess.

In FIG. 4-b, the structures associated with ground contacts 96 and 98 are pointed out. Sockets 114 are aligned with pin receiving apertures 168. Grooves 170, adjacent each aperture, receive finger 118 of the sockets. Platforms 172, positioned immediately inwardly of the apertures, are bracketed with square posts 174. The platforms extend almost to the top of the recess and the top of the posts are yet higher; i.e., just below the recess top. A cylindrical post 176, near the right hand side, and a flat post 178 define gap 180 there between. These two posts rest on top of a wall which extends up from the recess floor. This wall is indicated by reference numeral 182 in FIG. 3 but is not shown in FIG. 4-b for purposes of clarity. Slot 184 is provided on the lower side wall defining the recess.

As noted above, contacts 96 or 98 are positioned with the open end of sockets 114 in alignment with apertures 168 and with fingers 118 in grooves 170. The ends of bar 130 rests on platforms 172 between posts 174. The turned-in sections 132 and 134 slid down the sides of the platforms between the apertures and posts 174. Extension 142 on contact 96 is received in gap 180 with tab 102 projecting away therefrom.

In the case of dedicated ground contact 98, extension 146 rests in gap 180 with L-shaped arm 144 extending along the end wall on the right, around the corner and with the edge of tab 102 entering into slot 184.

The structures relating to the three 100 series contacts are pointed out in FIG. 4-c. Slots 186 are provided adjacent the outer end of each aperture 188. Gap 190 is defined by two rather large, square blocks 192. Another gap 194 is defined by posts 196.

The three contacts, 100-L1, 100-L2 and 100-L3, fit into the recess with sockets 104 being in alignment with apertures 188. Ears 112 are received in slots 186 and center portion 126 being positioned in gaps 190 and 194. The displaced tab on contact 100-L1 overlies the inner square block 192 and the tab on contact 100-L3 overlies the block adjacent the side wall. FIG. 5 illustrates this positioning.

With reference back to FIG. 3, a series of six pegs 198 extend outwardly from recess 150. Five pegs are next to side walls defining the recess while the sixth peg, indicated by the letter i attached to reference numeral 198, is set in a little to provide polarizing.

Breaks 200 in opposing end walls are provided to receive arms on the cover of the duplex receptacle. Notch or groove 202 is provided in one end wall for polarization; i.e., the rail 34 in recess 28 in side member 20 is received in the groove when the receptacle is plugged into that recess.

In addition to housing 148 and the contacts shown in FIG. 3, duplex receptacles 14 include cover 204 shown in FIGS. 1, 3 and 4-d. The outer surface 206 is shown in FIG. 3 to which reference is now made. Two sets of three apertures each extend through the cover. Apertures 208-d, 208-e and 208-f of one set are arranged in a row and are in the same pattern and spacing as apertures 38 d, e, f in side members 20. Apertures 210-a, 210-b and 210-c of the second set are staggered and patterned exactly as apertures 40 are in side members 20. Holes 212 provide depth clearance for ground pins on a conventional plug.

Six counterbore holes 214 and 214-i receive pegs 198 and 198-i. Arms 216 are provided, one on each end.

After the contacts are loaded into housing 148, the cover is placed there over with tabs 102 projecting out through appropriate apertures. The tab on contact 94 passes through aperture 210-b. The tabs on contact 96 pass through aperture 210-c and tab on contact 98 pass through aperture 210-a. The tab on contact 100-L1 passes through apertures 208-d, on contact 100-L2 through aperture 208-e and on contact 100-L3 through aperture 208-f. The arms enter breaks 200 in the side walls of the housing and pegs 198 and 198-i enter holes 214 and 214-i. The ends of the pegs are cold staked to secure the cover to the housing.

FIG. 4-d shows the inside surface 218. A pair of support members 220 are attached to and extend from that surface. These members are adjacent holes 212 and provide support for springs 116 on sockets 114 on contacts 96 and 98.

The duplex receptacles are placed in recesses 28 in junction box 12 with tabs 102 passing through apertures 38 and 40 and into sockets 86 on buss bars 24. With reference to FIG. 2, the tabs on contact 94 pass through aperture 40-b (FIG. 2) and enter a socket 86 on buss bar 24-b. The particular socket on the bar depends on which side of the junction box the duplex receptacle is plugged into. Tab 102 on contact 96 pass through aperture 40-c and into socket 86 on buss bar 24-c. The tab on alternate or dedicated ground contact 98 passes through aperture 40-a and enter the aligned socket on buss bar 24-a. Tab 102 on contact 100-L1 passes through aperture 38-d and into the socket 86 on bar 24-d. The tab on contact 100-L2 passes through aperture 38-e and enters socket 86 on bar 24-e. Finally the tab on contact 100-L3 passes through aperture 38-f and into the socket on buss bar 24-f.

As is well known, modular wall panels vary in thickness. Thus a duplex receptacle 14 may be flush with respect to one such panel and be recessed in a panel of a different manufacturer for example. Accordingly, the novel features of the present invention include providing various thickness covers 204 and increased tab 102 length. This feature makes it simple to accommodate different panel thicknesses. In the event of small increases, only a thicker cover 204 is required as the standard tab length preferably has an adequate length to engage the sockets on the buss bars. The tabs can be made longer during stamping and forming without changes in design for use with covers of greater thicknesses.

It is desirable to have some indication that a particular duplex receptacle is tapped into the dedicated or isolated ground contact 98. One means to accomplish this is to provide a housing within the receptacle for a light; e.g., a neon light. The light is tied into the circuit by wires within the receptacle attached to the power contact and the dedicated contact. The light passing through a small opening in the front face of housing 148 would allow the user to immediately identify the receptacle as one having a dedicated ground.

FIG. 5 illustrates in phantom a receptacle adapted to contain indicator light 224. The light is positioned in cavity 226 (bulb facing into the paper) with power wire 228 from the tail of the light attached to power contact 100 and neutral wire 230 attached to neutral contact 94.

In summary a junction box is provided having three power buss bars, one neutral buss bar, one ground buss bar and one dedicated buss bar. Duplex receptacles are provided with power contacts adapted to engage a particular power buss bar so that overloading is avoided. Further, the dedicated ground bar and contact permits the use of sensitive electronic equipment without installing a separate system.

The present invention may be subject to many modifications and changes without departing from the spirit or essential characteristics thereof. The present embodiment is therefore intended in all respects as being illustrative and not restrictive of the scope of the invention.

What is claimed is:

1. A power distribution unit for modular wall panels and the like, comprising:
   a. a junction box having a recess on each of two opposing, longitudinal sides with floors of the recesses having apertures therethrough and being parallel to the longitudinal sides;
   b. a plurality of elongated buss bars positioned in the junction box with one or more buss bars having electrical engaging means in alignment with said apertures in said recesses;
   c. a receptacle for being received in one of said recesses and having electrical means for engaging the electrical engaging means on the one or more buss bars having electrical engaging means; and
   d. a plurality of cover means selectively attachable to the one side of the receptacle which bears against the floor of the recess, each cover means having a different thickness so that the receptacle, when positioned in the recess, will extend out of the recess a distance determined by the particular cover means selected and attached to the one side.

2. An electrical power junction box for use in an electrical power distribution system, comprising:
   dielectric housing means having electrical bus means disposed therein and extending therethrough from one end to the other, said electrical bus means including one ground bus means, two neutral bus means and two power bus means;
   electrical contact means at the ends of said bus means, said contact means being disposed in respective opening at the ends of said housing means, said electrical contact means electrically connectable with complimentary electrical contact members of electrical connector means latchably mountable onto the ends of said housing means;
   receptacle-receiving areas extending along each side of said housing means, said receptacle-receiving areas having a pattern of apertures extending through each side of said housing means respectively;
   electrical contact areas of said bus means at said apertures;
   electrical receptacle means positionable in one or both of said receptacle-receiving areas of said housing means, said receptacle means being adapted to receive electrical plugs of the type having two or three outwardly extending prongs; and
   electrical contact member means positionable in said electrical receptacle means and including a ground electrical contact member means for electrical connection with said ground bus means, one of at least two neutral line electrical contact member means with each having connectable means at different spatial locations relative to each other for selective electrical connection with one or another of said two neutral bus means and one of at least two power line electrical contact member means with each having connectable means at different spatial locations relative to each other for selective electrical connection with one or another of the two power bus means.

3. An electrical power distribution system for use as part of modular wall panels, comprising:
   electrical power junction box means having dielectric housing means including side member means and end means;
   electrical bus means disposed along said side member means and having intermediate contact means and end contact means, said intermediate contact means being located at apertures in the side member means, said electrical bus means including two ground bus means, one neutral bus means and two power bus means;
   said end means having contact-receiving means along which said end contact means of said bus means extend;
   electrical connector means including dielectric-housing means and electrical terminal means latchably mounted onto said end means with the electrical terminal means electrically connectable with said end contact means;
   each of said side member means having receptacle-receiving areas, said areas enclosing said apertures;
   electrical receptacle means positionable in one or both of said receptacle-receiving areas, said receptacle means being adapted to receive electrical plugs of the type having two or three outwardly extending prongs; and
   electrical contact member means positionable in said electrical receptacle means and including a neutral line electrical contact member means for electrical connection with said neutral bus means, one or two ground electrical contact member means with each having connectable means at different spatial locations relative to each other for selective electrical connection with one or another of said two ground bus means and one of two power line electrical contact member means with each having connectable means at different spatial locations relative to each other for selective electrical connection with one or another of the two power bus means.

* * * * *